United States Patent [19]

Motegi et al.

[11] Patent Number: 4,921,926

[45] Date of Patent: May 1, 1990

[54] CURABLE POLYORGANOSILOXANE COMPOSITION

[75] Inventors: Tsuneo Motegi; Yasuji Matsumoto; Kiyoshi Takeda; Shuji Chiba, all of Gunma, Japan

[73] Assignee: Toshiba Silicone Co., Ltd., Tokyo, Japan

[21] Appl. No.: 271,985

[22] Filed: Nov. 16, 1988

[30] Foreign Application Priority Data

Nov. 18, 1987 [JP] Japan .................................. 62-291540

[51] Int. Cl.$^5$ .............................................. C08G 77/06
[52] U.S. Cl. .......................................... 528/17; 528/24; 528/34; 528/33; 528/32; 522/99; 522/148
[58] Field of Search ........................ 528/24, 17, 34, 33, 528/32; 522/99, 148

[56] References Cited

U.S. PATENT DOCUMENTS 4,528,081  7/1985  Lien et al. ............................ 528/34
4,824,875  4/1989  Gutek .................................. 528/33

Primary Examiner—Melvyn I. Marquis
Assistant Examiner—Karen A. Hellender
Attorney, Agent, or Firm—Sughrue, Mion, Zinn, Macpeak & Seas

[57] ABSTRACT

A curable polyorganosiloxane composition is disclosed, comprising: (A) 100 parts by weight of polyorganosiloxane having at least two hydroxyl groups or hydrolyzable groups bonded to a silicon atom in the molecule thereof and having a viscosity at 25° C. of 10 to 1,000,000 cSt, (B) 0 to 2,000 parts by weight of polyorganosiloxane having at least two alkenyl groups bonded to a silicon atom in the molecule thereof and having a viscosity at 25° C. of 10 to 1,000,000 cSt, (C) 0.5 to 20 parts by weight of an organosilicon compound having more than 2 (on the average) hydrolyzable groups bonded to a silicon atom in the molecule thereof, (D) 0 to 10 parts by weight of a catalyst for a condensation reaction, and (E) 0.1 to 5 parts by weight of an organic peroxide, wherein at least 0.01 mol % of all organic groups bonded to a silicon atom as contained in (A) to (C) is an alkenyl group. The composition has both condensation reaction curability and ultraviolet ray curability.

6 Claims, No Drawings

CURABLE POLYORGANOSILOXANE COMPOSITION

FIELD OF THE INVENTION

The present invention relates to a curable polyorganosiloxane composition and more particularly to a polyorganosiloxane composition having both condensation reaction curability and ultraviolet ray curability.

BACKGROUND OF THE INVENTION

As curable polyorganosiloxane compositions, a condensation reaction curable composition and an ultraviolet ray curable composition have been known.

The former condensation reaction curable polyorganosiloxane composition is a composition comprising polyorganosiloxane having a silanol group and an organosilicon compound having a hydrolyzable group which is to be cured with compounds such as tin compounds and titanium compounds (see, for example, JP-B-38-16798 and JP-B-40-21631 (the term "JP-B" as used herein refers to an "examined Japanese patent publication")). Such compositions are curable with moisture in the air at ordinary room temperature and are less subject to insufficient curing as encountered in addition reaction type compositions and, therefore, are used as a sealing material for construction, a coating material and a mold making material, a roll for copying machines, and so on.

These compositions, however, have a disadvantage in that they are unsuitable for use as adhesives for temporary fixation, i.e., for parts which are to be moved in a short time after fixation, although they are uniformly cured even in the inside thereof when allowed to stand for a long time because they are cured through permeation of moisture.

As ultraviolet ray-curable polyorganosiloxane compositions, (1) a composition in which various photosensitizers are added to a vinyl group-containing polyorganosiloxane composition and which is cured upon irradiation of high intensity ultraviolet rays (U.S. Pat. No. 3,726,710), (2) a composition comprising a mercapto group-containing polyorganosiloxane, polymethylvinylsiloxane and various peroxides (U.S. Pat. No. 3,816,282), (3) a composition comprising vinyl group-containing polyorganosiloxane, polyorganohydrodienesiloxane and a photosensitizer (JP-B-52-40334), (4) a composition comprising an acryl-based unsaturated group-containing polyorganosiloxane and a photosensitizer (JP-A-48-19682 (the term "JP-A" as used herein refers to a "published unexamined Japanese patent application")), and so on have been proposed.

These compositions are all instantly cured upon irradiation of ultraviolet rays, but have a disadvantage in that in the case of thick films, ultraviolet rays do not reach the inside thereof and thus areas where ultraviolet rays do not reach remain uncured.

For the purpose of overcoming the drawbacks of the above two types of compositions, as a composition having both condensation reaction curability and ultraviolet ray curability, a composition comprising a diorganopolysiloxane terminated a hydroxyl group at both ends thereof, a vinylsilane having a hydrolyzable group, organosiloxane having a mercapto group/ a curing catalyst and a photosensitizer has been proposed (JP-A-60-23176).

This composition, however, has disadvantages in that it has an unpleasant odor at the time of reaction which is characteristic of mercapto group-containing compounds, and when heat is applied, it converts metals into their sulfides.

In addition, a composition comprising an acryl. dialkoxysilyl or an acryl.diallyloxysilyl group-terminated polyorganosiloxane and a photosensitizer which contains a moisture curable catalyst has been proposed (JP-A-61127718, JP-A-61-276810). This composition, however, is poor in heat resistance and cold resistance, and is slow in rate of curing.

SUMMARY OF THE INVENTION

An object of the present invention is to provide a composition which has quick curing properties due to ultraviolet ray curing and deep portion curing properties due to condensation reaction curing, and which has no unpleasant odor and is free from the adverse influences of by-products.

It has been found that the object can be attained by using an organic peroxide as a photocuring catalyst for compositions having both these reaction mechanisms.

The present invention relates to a curable polyorganosiloxane composition comprising:

(A) 100 parts by weight of polyorganosiloxane having at least two hydroxyl groups or hydrolyzable groups bonded to a silicon atom in the molecule thereof, and having a viscosity at 25° C. of 10 to 1,000,000 cSt;

(B) 0 to 2,000 parts by weight of polyorganosiloxane having at least two alkenyl groups bonded to a silicon atom in the molecule thereof, and having a viscosity at 25° C. of 10 to 1,000,000 cST;

(C) 0.5 to 20 parts by weight of an organosilicon compound having more than two (on the average) hydrolyzable groups bonded to a silicon atom in the molecule thereof;

(D) 0 to 10 parts by weight of a catalyst for condensation reaction; and (E) 0.1 to 5 parts by weight of an organic peroxide, wherein at least 0.01 mol % of all organic groups bonded to a silicon atom as contained in (A) to (C) is an alkenyl group.

The polyorganosiloxane (A) of the present invention is a base polymer of the cured product of the present composition, which is required to have at least two hydroxyl groups or hydrolyzable groups bonded to a silicon atom in the molecule thereof so as to be cured through the condensation reaction. Examples of the hydrolyzable group are an alkoxy group, e.g., a methoxy group, an ethoxy group, a propoxy group and a butoxy group; an alkoxyalkoxy group, e.g., a 2-methoxyethoxy group and a 2-ethoxyethoxy group; an alkenyloxy group, e.g., a propenoxy group; an acyloxy group, e.g., an acetoxy group and an octanoxy group; a ketoxim group, e.g., an acetonoxim group and a methylethylketoxim group; an organoamino group, e.g., a diethylamino group, a butylamino group, a hexylamino group and a cyclohexylamino group; a diorganoaminoxy group, e.g., a dimethylaminoxy group and a diethylaminoxy group; and an organoamido group, e.g., an N-methylacetamido group.

Of the above hydrolyzable group, from the standpoints of ease of preparation and the rate of curing, a methoxy group, an ethoxy group, a propoxy group, an isopropenoxy group, an acetoxy group, a methylethylketoxim group, a diethyamino group, a diethylaminoxy group and an N-methylacetamido group are preferred. In the case wherein the composition is used in electric or electronic applications, it is necessary not to cause corrosion of various metals and, therefore, an alkoxy group, e.g., a methoxy group and an ethoxy group, or an alkenyloxy group, e.g., an isopropenoxy group, is particularly preferred.

Examples of the other organic group bonded to a silicon atom are an alkyl group, e.g., a methyl group, an ethyl group, a propyl group, a butyl group and a hexyl group; an alkenyl group, e.g., a vinyl group and an allyl group; an aryl group, e.g., a phenyl group; an aralkyl group, e.g., a β-phenylethyl group and a β-phenylpropyl group; and a monovalent substituted hydrocarbon group, e.g., a 3, 3, 3-trifluoropropyl group, a chloromethyl group and a β-cyanoethyl group. Of these, an intermediate material containing a methyl group can be most easily obtained, and a methyl group provides a low viscosity irrespective of the degree of polymerization of siloxane, improving the balance between workability of the composition before curing and the physical properties of the cured rubber-like elastomer. Thus, it is preferred that at least 85% of all organic groups is a methyl group. For a group other than the methyl group, it is preferred to cause the curing reaction upon irradiation of ultraviolet rays so that an electric or electronic part is temporarily fixed by the curing reaction of the composition. It is, therefore, preferred that at least two alkenyl groups be contained in the molecule. From the standpoint of ease of synthesis, it is preferred that the alkenyl group be a vinyl group. The component (A) should have a viscosity ranging between 10 and 1,000,000 cSt at 25° C. in order to impart excellent mechanical properties to the rubber-like elastomer after curing.

If the viscosity at 25° C. is less than 10 cSt, elongation of the rubber-like elastomer after curing is not sufficient. On the other hand, if it is more than 1,000,000 cSt, a uniform composition is difficult to prepare and workability is reduced. In order to harmonize the properties of the composition before and after curing, it is particularly preferred that the viscosity at 25° C. be within the range of 20 to 200,000 cSt.

The polyorganosiloxane (B) of the present invention undergoes the crosslinking reaction through curing with ultraviolet rays and therefore must have at least two alkenyl groups bonded to a silicon atom in the molecule thereof. Examples of an organic group other than the alkenyl group are an alkyl group, e.g., a methyl group, an ethyl group, a propyl group, a butyl group and a hexyl group; an aryl group such as a phenyl group; an aralkyl group, e.g., a β-phenylethyl group and a β-phenylpropyl group; and a monovalent substituted hydrocarbon group, e.g., a 3,3,3-trifluoropropyl group, a chloromethyl group and a β-cyanoethyl group. From the standpoints of ease of synthesis and strength and heat resistance of the cured rubber-like elastomer, it is preferred that the alkyl groups be all methyl groups, or a methyl group and a phenyl group. In the case where a phenyl group is present, it is preferred from the standpoint of yellow coloration and an economic standpoint that the phenyl group content be not more than 10%. Examples of the alkenyl group are a vinyl group and an allyl group. From the standpoints of ease of synthesis and so forth, a vinyl group is more preferred. The viscosity at 25° C. of the component (B) should be within the range of 10 to 1,000,000 cSt for the same reasons as in the component (A).

If the viscosity at 25° C. is less than 10 cSt, elongation of the cured rubber-like elastomer is not sufficiently large. On the other hand, if it is more than 1,000,000 cSt, a uniform composition is difficult to obtain and workability becomes poor. In order to harmonize the properties of the composition before and after curing, it is particularly preferred that the viscosity at 25° C. be in the range of 20 to 200,000 cSt.

If the amount of the alkenyl group bonded to a silicon atom as contained in the components (A) and (C) is not less than 0.01 mol % of all organic groups bonded to a silicon atom as contained in the components (A) and (B), component (B) is not always needed. Otherwise, it is necessary for the component (B) to be used in an amount of not more than 2,000 parts by weight, preferably not more than 1,000 parts by weight, per 100 parts by weight of the component (A). If the amount of the component (B) compounded is too large, curability in the deep portion of a cured product is undesirably reduced.

The component (C) to be used in the present invention is hydrolyzed by moisture and readily undergoes a condensation reaction with a silanol group of the component (A), and is an organosilicon compound having more then 2 (on the average) hydrolyzable groups bonded to a silicon atom in the molecule thereof. Examples of the hydrolyzable group are an alkoxy group, e.g., a methoxy group, an ethoxy group, a propoxy group and a butoxy group; an alkoxyalkoxy group, e.g., a 2-methoxyethoxy group and a 2-ethoxyethoxy group; an alkenyloxy group, e.g., a propenoxy group; an acyloxy group, e.g., an acetoxy group and an octanoyloxy group; a ketoxime group, e.g., an acetonoxime group and a methylethylketoxime group; an organoamino group, e.g., a diethylamino group, a butylamino group, a hexylamino group and a cyclohexylamino group; a diorganoaminoxy group, e.g., a dimethylaminoxy group and a diethylaminoxy group; and an organoamido group, e.g., an N-methylacetamido group.

Of these hydrolyzable group, from the standpoints of ease of synthesis and the rate of curing, a methoxy group, an ethoxy group, a propoxy group, an isopropenoxy group, an acetoxy group, a methylethylketoxim group, a diethylamino group, a diethylaminoxy group and an N-methylacetamido group are preferred. In a case where the composition is used in the electric or electronic field, it must not cause corrosion of metals and, therefore, a methoxy group, an ethoxy group and an isopropenoxy group are particularly preferred.

The group bonded to a silicon atom of the component (C) is, as well as the above hydrolyzable group, a monovalent substituted or unsubstituted hydrocarbon group. From the standpoints of ease of synthesis of the organosilicon compound and the rate of curing, an alkyl group having 1 to 8 carbon atoms, an alkenyl group having 2 to 3 carbon atoms and a phenyl group are preferred, and a methyl group is most preferred.

Specific examples of the component (C) are alkoxysilanes such as methyltrimethoxysilane, vinyltrimethoxysilane, methyltriethoxysilane, vinyltriethoxysilane, tetraethoxysilane and tetrapropoxysilane and their partially hydrolyzed condensates; alkoxysiloxanes, e.g., having the formula:

alkenyloxysilanes such as methyltripropenoxysilane, vinylpropenoxysilane and tetrapropenoxysilane and their partially hydrolyzed condensates; acyloxysilanes such as methyltriacetoxysilane, vinyltriacetoxysilane and diacetoxydibutoxysilanes and their partially hydrolyzed condensates; acyloxysilane such as (CH$_3$COO)(CH$_3$)$_2$SiOSi(CH$_3$)$_2$(OCOCH$_3$) and C$_6$H$_5$Si[OSi(OCOCH$_3$)$_3$]$_3$; ketoximsilanes such as methyltris(acetonoxim)silane and methyltris(methylethylketoxim)-silane and their partially hydrolyzed condensates; ketoximsilane having the formula:

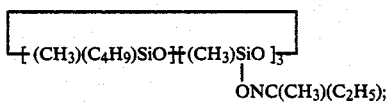
$$-[(CH_3)(C_4H_9)SiO]-[(CH_3)SiO]-$$
$$\quad\quad\quad\quad\quad\quad\quad |$$
$$\quad\quad\quad\quad\quad\quad ONC(CH_3)(C_2H_5);$$

organoaminosilanes such as methyltris(dimethylamino)silane, methyltris(diethylamino)silane and methyltris(cyclohexylamino)silane and their partially hydrolyzed condensates; organoaminosiloxane having the formula:

(CH$_3$)$_2$N(CH$_3$)$_2$SiO(CH$_3$)$_2$SiN(CH$_3$)$_2$;
diorganoaminoxysilanes such as
methyltris(dimethylaminoxy)silane and
methyltris(diethylaminoxy)silane and their
partially hydrolyzed condensates;
diorganoaminoxysilanes such as

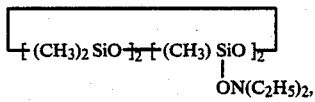
$$-[(CH_3)_2SiO]-[(CH_3)SiO]-$$
$$\quad\quad\quad\quad\quad\quad |$$
$$\quad\quad\quad\quad\quad ON(C_2H_5)_2,$$

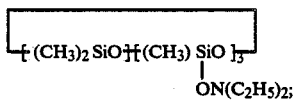
$$-[(CH_3)_2SiO]-[(CH_3)SiO]-$$
$$\quad\quad\quad\quad\quad\quad |$$
$$\quad\quad\quad\quad\quad ON(C_2H_5)_2;$$

and organoamidosilanes such as methyltris(N-methylacetamido)silane and their partially hydrolyzed condensates. Compounds in which the number of hydrolyzable groups bonded to a silicon atom as contained in the molecule is only two cannot be used as the component (C) by themselves, but can be used in combination with compounds having at least three hydrolyzable groups.

The amount of the component (C) compounded is 0.5 to 20 parts by weight, preferably 2.0 to 10 parts by weight, per 100 parts by weight of the component (A). If the amount of the component (C) used is too small, crosslinking proceeds only insufficiently. On the other hand, if it is too large, physical properties after curing are reduced.

In order to conduct the curing reaction with ultraviolet rays in the present invention, it is necessary that at least 0.01 mol % of all organic groups bonded to a silicon atom as contained in the silicon compounds of the components (A) to (C) is an alkenyl group. It is preferred for the polyorganosiloxane of the component (A) to contain at least two alkenyl groups bonded to a silicon atom in the molecule thereof, because it imparts preferred mechanical characteristics to the cured product.

In the present invention, depending on the type of the component (C), the reaction proceeds at ordinary room temperature without use of a catalyst. In many cases, it is preferred to add the component (D) as a catalyst in order to accelerate the curing reaction. As the catalyst, amine compounds such as dimethylhexylamine, diethylhydroxylamine and tetramethylguanidine; quaternary ammonium salts such as tetramethylammonium chloride and trimethylhexylammonium chloride; organic acid metal salts such as zinc octanate, tin octanate, dibutyltin diacetate, dibutyltin dioctoate, dibutyltin dilaurate and dioctyltin dilaurate; and titanium compounds such as tetrapropyl titanate, tetrabutyl titanate, dipropoxybis(acetylacetonato)titanium, dipropoxybis(ethylacetoacetato)titanium, 1,3-dioxypropanebis(acetylacetonato)titanium, 1,3-dioxypropanebis(ethylacetoacetato)titanium and the like can be used.

Of these compounds, organotitanium compounds are particularly effective when the composition of the present invention is used in one pack, because they decompose the organic peroxide of the component (E) at a low speed.

The amount of the component (D) added varies with the type thereof and is not critical. In general, the amount of the component (D) used is 0 to 10 parts by weight per 100 parts by weight of the component (A). In the case of tetrabutyl titanate, the amount of tetrabutyl titanate used is suitably to be from 0.5 to 5 parts by weight.

The component (E) to be used in the present invention is decomposed when irradiated with ultraviolet rays, generating radicals and photocuring the composition of the present invention.

Compounds which can be used as the component (E) are acyl organic peroxides such as benzoyl peroxide, 2,3-dimethylbenzoyl peroxide, 2,4-dimethylbenzoyl peroxide, 2,5-dimethylbenzoyl peroxide, m-chlorobenzoyl peroxide, p-chlorobenzoyl peroxide and 2,4-dichlorobenzoyl peroxide; alkyl organic peroxides such as di-tert-butyl peroxide, 2,5-di-tert-butyl peroxy-2,5-dimethylhexane, 2,5-di-tert-butylperoxy-2,5-dimethylhexine, tert-butylcumyl peroxide and dicumyl peroxide; ester organic peroxides such as tert-butylperoxy-benzoate, tert-butylperoxy-4-chlorobenzoate, tert-butylperoxy-2,4-dichlorobenzoate and tert-butylperoxy-4-toluoate; and peroxyketals such as 1,1-di(tert-butylperoxy)cyclohexane, 1,1-di(tert-butylperoxy)-3,3,5-trimethylcyclohexane and 2,2-di(tert-butylperoxy)butane.

Of the organic peroxides, the ester organic peroxides are preferred because they are compatible with the components (A) and (B), and do not cause coloration. Taking into consideration ease of availability, tertbutylperoxy benzoate is particularly preferred.

The amount of the component (E) compounded is 0.1 to 5 parts by weight, preferably 0.1 to 2 parts by weight, per 100 parts by weight of the component (A). With less than 0.1 part by weight, curing is slow and no sufficient curing effect can be obtained. Even if it is added in an amount in excess of 5 parts by weight, the increased effect cannot be obtained.

To the composition of the present invention, a photosensitizer is preferably added to accelerate the curing reaction due to irradiation of ultraviolet rays. Substances which can be used are ketone or ether compounds such as acetophenone, benzophenone, benzoin propyl ether, benzoin butyl ether, diethoxyacetophenone, 2-methyl-2-hydroxypropiophenone, 1-(4-isopropylphenyl)-2-hydroxy-2-methylpropanone, 2-hydroxy-2-methyl-1-phenylpropane-1-on and the like, and quinone compounds such as benzoquinone, anthraquinone, 1,2-naphthoquinone and the like.

The amount of the photosensitizer added is not more than 20 parts by weight per 100 parts by weight of the component (A). In general, it is preferably in the range of 0.1 to 5 parts by weight.

The composition of the present invention can be prepared in such a manner that part of the components (A) and (B), and the components (C) and (D) are packed in one pack and the remainder of the components (A) and (B), and the component (E) and, if necessary, a photosensitizer, are packed in the other pack, or alternatively in such a manner that the components (A) to (E) are packed in one pack. In either case, since the composition of the present invention is cured by moisture or by irradiation with ultraviolet rays, it is necessary to store in a sealed condition free from ultraviolet rays.

To the composition of the present invention, if necessary, a filler, a pigment, a heat resistance-increasing agent, an adhesion aid, a flame retardant, an antifungal substance and the like may be added. Moreover, depending on the purpose, a solvent may be used in combination, or other polyorganosiloxanes may be used in combination within the range that does not deteriorate the effects of the present invention. As the above additives which are added if necessary, a filler, e.g., fumed silica, precipitated silica, quartz powder, diatomaceous earth, titanium oxide, aluminum oxide, zinc oxide, iron oxide, mica, clay, carbon black, graphite, glass beads, metal powder, and calcium carbonate, additives to impart heat resistance and flame retardance, e.g., zinc carbonate, manganese carbonate, cerium oxide and cerium hydroxide, an adhesion promoter, a solvent such as toluene, xylene and n-hexane, and a viscosity controlling agent can be used.

The composition of the present invention, when applied to a substrate and irradiated with ultraviolet rays, instantly produces temporary fixation, and it is completely cured through the condensation reaction due to moisture even in a deep portion where ultraviolet rays do not reach and thus the curing reaction does not occur. Moreover, since a mercapto group-containing silicon compound is not used, problems such as unpleasant odor at the time of reaction and corrosion of the substrate can be avoided. Thus, the composition of the present invention is useful in a case where parts temporarily fixed should be removed quickly, as in potting of electric or electronic parts. Furthermore, the operation time can be greatly shortened.

The present invention is described in greater detail by reference to the following examples. All parts are by weight, and the viscosity is a viscosity at 25° C.

EXAMPLE 1

50 parts of polydimethylsiloxane terminated in a silanol group at both ends and having a viscosity of 3,000 cSt, and 50 parts of polyorganosiloxane terminated in a trimethylsilyl group at both ends, comprising 10 mol % of a methylvinylsiloxane unit and 90 mol % of a dimethylsiloxane unit, and having a viscosity of 4,000 cSt were mixed to prepare B-1.

To 100 parts of B-1, 4 parts of methyltrimethoxysilane, 0.6 part of tetraisopropyl titanate and 1 part of tert-butylperoxy benzoate were added, and they were uniformly mixed under a moisture-shielded condition to obtain Composition S-1 of the present invention.

Comparative composition R-1 not containing an organic peroxide was prepared by removing the tert-butylperoxy benzoate from the S-1.

Each composition was introduced in a mold capable of producing a molding having a thickness of 2 mm and coated with polyethylene fluoride, and cured under the conditions shown in Table 1. The depth of curing and hardness (measured using Model A spring-type hardness tester according to JIS K6301) were measured and shown in Table 1.

TABLE 1

| Curing Condition* | Sample | |
|---|---|---|
| | S-1 | R-1 |
| I Curing Depth (mm) | 0.6 | 0 |
| Hardness | — | — |
| II Curing Depth (mm) | 2.0 | 0 |
| Hardness | 15 | — |
| III Curing Depth (mm) | 2.0 | 2.0 |
| Hardness | 16 | 16 |
| IV Curing Depth (mm) | 2.0 | 2.0 |
| Hardness | 16 | 16 |

*I: Irradiated for 10 seconds at a distance of 10 cm by the use of an ozone generating high pressure mercury lamp (160 W/cm).
II: Irradiated for 30 seconds at a distance of 5 cm by the use of an ozone generating high pressure mercury lamp.
III: Allowed to stand for 48 hours in an atmosphere of 25° C. and 60% RH.
IV: Allowed to stand under the conditions of III after irradiation with ultraviolet rays under the conditions of I.

EXAMPLE 2

To 100 parts of S-1 as obtained in Example 1 was further added 0.5 part of benzophenone to prepare Composition S-2 of the present invention. When S-2 was introduced in the same mold as used in Example 1 and irradiated with ultraviolet rays under the curing conditions of I, it was cured to a depth of 1.2 mm in a rubber-like state. When irradiated with ultraviolet rays for 15 seconds under the conditions of II, it was cured to a depth of 2.0 mm. Under the conditions of III and IV, it was cured to a depth of 2.0 in a rubber-like state.

EXAMPLE 3

To B-1 used in Example 1, 3.5 parts of methyltrispropenoxysilane and 1 part of tert-butylperoxy benzoate were added, and they were uniformly mixed under a moisture shielded condition to obtain Composition S-3 of the present invention. S-3 was introduced in the same mold as used in Example 1 and cured under the conditions of II, III and IV. In all cases, it was cured to a depth of 2.0 mm in a rubber-like state.

EXAMPLE 4

To 100 parts of polyorganosiloxane terminated in a silanol group at both ends, comprising 10 mol % of a methylvinylsiloxane unit and 90 mol % of a dimethylsiloxane unit and having a viscosity of 4,000 cSt were added 4 parts of methyltrimethoxysilane, 0.6 part of tetraisopropyl titanate and 1 part of tert-butylperoxy benzoate, and they were uniformly mixed under a moisture shielded condition to obtain Composition S-4 of the present invention.

Comparative composition R-2 not containing an organic peroxide was prepared by removing tert-butylperoxy benzoate from S-4.

Each composition was introduced in a mold capable of producing a molding having a thickness of 2 mm and coated with polyethylene fluoride and cured under the conditions shown in Table 2. The depth of curing and hardness (the same as defined before) were measured and shown in Table 2.

TABLE 2

| Curing Conditions | | Sample | |
| --- | --- | --- | --- |
| | | S-4 | R-2 |
| I | Depth of Curing (mm) | 1.0 | 0 |
| | Hardness | — | — |
| II | Depth of Curing (mm) | 2.0 | 0 |
| | Hardness | 16 | — |
| III | Depth of Curing (mm) | 2.0 | 2.0 |
| | Hardness | 14 | 14 |
| IV | Depth of Curing (mm) | 2.0 | 2.0 |
| | Hardness | 15 | 15 |

EXAMPLE 5

To 100 parts of S-4 used in Example 1 was added 0.5 part of benzophenone to obtain Composition S-5 of the present invention. S-5 was introduced in the same mold as used in Example 1 and when irradiated with ultraviolet rays under the curing conditions of I, cured to a depth of 1.4 mm in a rubber-like state. When irradiated with ultraviolet rays for 15 seconds under the conditions of II, it was cured to a depth of 2.0 mm. Even under the conditions of III and IV, it was cured to a depth of 2.0 mm in a rubber-like state.

While the invention has been described in detail and with reference to specific embodiments thereof, it will be apparent to one skilled in the art that various changes and modifications can be made therein without departing from the spirit and scope thereof.

What is claimed is:

1. A curable polyorganosiloxane composition comprising:
   (A) 100 parts by weight of polyorganosiloxane having at least two hydroxyl groups or hydrolyzable groups bonded to a silicon atom in the molecule thereof and having a viscosity at 25° C. of 10 to 1,000,000 cSt;
   (B) 0 to 2,000 parts by weight of polyorganosiloxane having at least two alkenyl groups bonded to a silicon atom in the molecule thereof and having a viscosity at 25° C. of 10 to 1,000,000 cSt;
   (C) 0.5 to 20 parts by weight of an organosilicon compound having more than 2, on the average, hydrolyzable groups bonded to a silicon atom in the molecule thereof;
   (D) 0 to 10 parts by weight of a catalyst for a condensation reaction; and
   (E) 0.1 to 5 parts by weight of an organic peroxide, wherein at least 0.01 mol % of all organic groups bonded to a silicon atom as contained in (A) to (C) is an alkenyl group.

2. The composition as claimed in claim 1, wherein the hydrolyzable group of (A) is an alkoxy group or an alkenyloxy group.

3. The composition as claimed in claim 2, wherein at least two of the organic groups bonded to a silicon atom of (A) are alkenyl group.

4. The composition as claimed in claim 1, wherein the condensation reaction catalyst of (D) is an organotitanium compound.

5. The composition as claimed in claim 1, wherein (E) is an ester organic peroxide.

6. The composition as claimed in claim 1, wherein (E) is a tert-butylperoxy benzoate.

* * * * *